April 10, 1928.
G. A. DELF
DIE
Filed Feb. 26, 1926
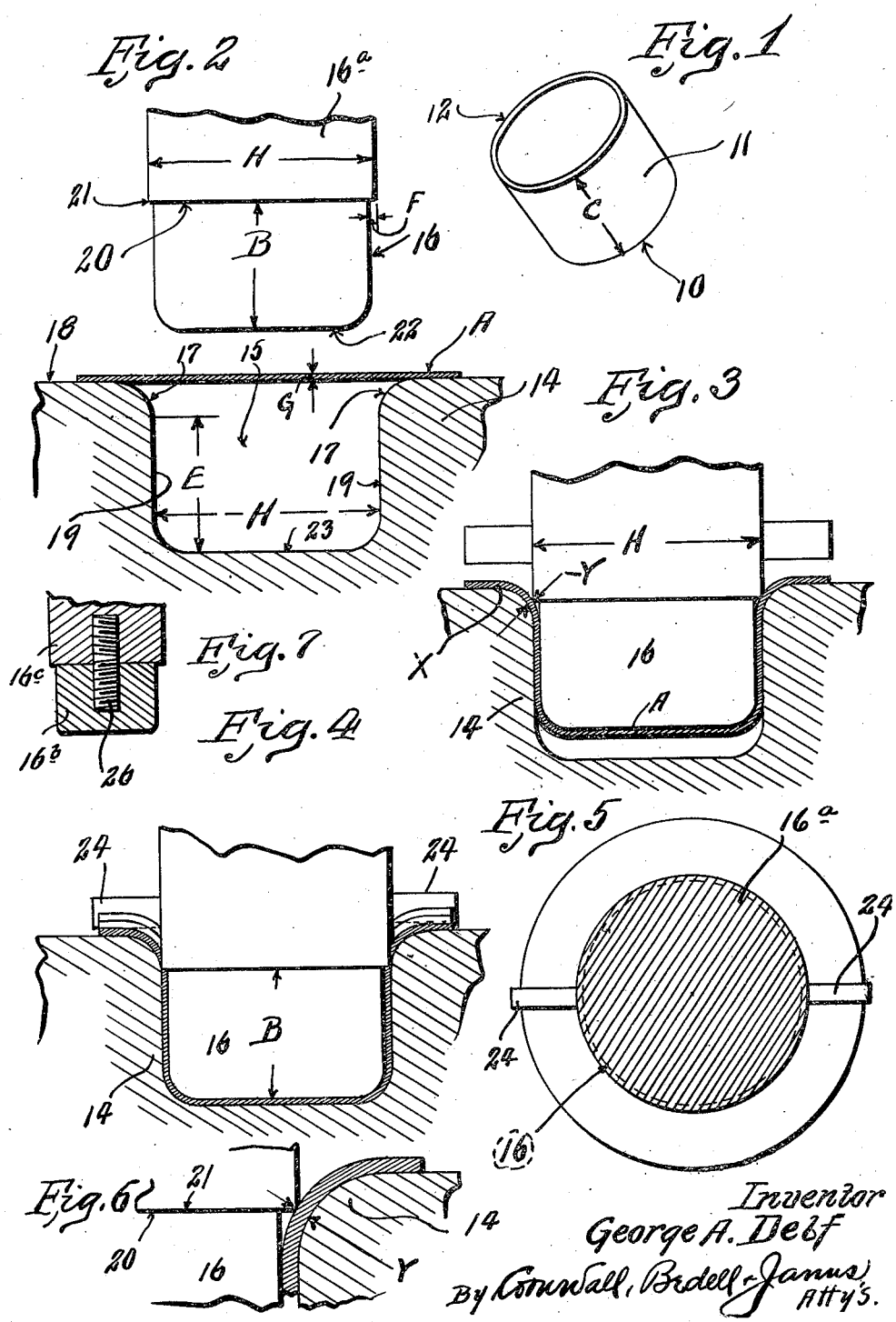

Patented Apr. 10, 1928.

1,665,203

UNITED STATES PATENT OFFICE.

GEORGE A. DELF, OF ST. LOUIS, MISSOURI, ASSIGNOR TO JOSEPH PAVELKA, OF ST. LOUIS, MISSOURI.

DIE.

Application filed February 26, 1926. Serial No. 90,818.

This invention relates to a new method of trimming stampings and to new and useful improvements in trimming dies.

Heretofore in the manufacture of stamped articles having marginal flanges it has been customary to trim the edges of the flanges in a separate operation by a trimming die especially made for the purpose. This necessitated an additional die and required additional handling of the stamped article thereby adding considerably to the manufacture and cost of such articles, due to the time and labor involved.

It is the object of the present invention to provide a novel method of manufacturing stamped articles whereby the edges of the article are trimmed by means of the die utilized in the manufacture of the article and said trimming operation is applied during the stamping or punching operation.

Further objects of the invention are to provide a die which not only presses or stamps the article, but simultaneously trims the edges thereof, thereby eliminating separate trimming dies and saving time and labor in moving the articles from one press to the other, or in changing the dies in the press.

Additional objects of the invention are to provide an improved method of manufacturing stamped articles thereby simplifying the operation and reducing the cost of production.

With these and other objects in view this invention consists in certain novel features and arrangements of parts hereinafter more fully described and illustrated in the accompanying drawings, in which:—

Figure 1 is a perspective view of one of the articles stamped and trimmed according to my method.

Figure 2 is a conventional illustration of the die showing the position of the punch preparatory to the stamped and trimming operation.

Figure 3 is a similar view but showing the punch member in moved position and in readiness for the trimming operation.

Figure 4 is a similar view but showing the punch member in its lower-most position or at the completion of the operative stroke thereof.

Figure 5 is a horizontal section taken on lines 5—5 of Figure 4.

Figure 6 is an enlarged detail view.

Figure 7 is a detail sectional view of a modified form of the punch.

For the purpose of illustrating the invention the stamped article is shown as being cup-shaped as indicated at 10 having an annular flange 11 the edges 12 of which have been trimmed during the stamping operation. The cup is formed from a sheet of material such as indicated at A, Figure 1, which is placed on the die or forming block 14 as shown in Figure 2, said die being formed with a cup-shaped recess 15 for receiving punch 16 which is disposed above sheet A and is movable downwardly into recess 15. The mouth of recess 15 is curved or flared out as indicated at 17, so as to eliminate the sharp corners between the upper face 18 of die forming block 14 and the walls 19 of recess 15.

Punch 16 is formed with an annular shoulder 20 having a sharp cutting edge 21. The distance between the shoulder 20 and bottom 22 of punch 16 is equal to the height of the flange wall 11 of the article 10, as indicated by lines B and C. These distances are equal to the distance between the bottom 23 of recess 15 and the tangential point of wall 19 and curved portion 17 as indicated by line E. The depth of shoulder 20 is preferably equal to the thickness of the sheet of material from which the article is to be stamped as indicated by letters F and G, respectively.

In the operation, the sheet A is placed on the forming block 14 as shown in Figure 2. Punch 16 is now operated and draws the sheet of material A into recess 15 as illustrated in Figure 3. When punch 16 has reached, during its downward movement, the position shown in Figure 3 annular shoulder 20 is brought against the portions X of the member A and the continued movement of punch 16 severs portion X from the formed cup at point Y.

Punch 16 now moves downwardly sufficient distance to bring shoulder 20 past the severed portion X and complete the drawing operation of the cup 10 as shown in Figure 4. Just before the completion of the downward movement of punch 16 knives 24 carried by punch 16 bear against marginal portion X and cut the latter preferably at two diametrically opposed points so that these portions can be readily removed from the die mechanism. Punch 16 is now moved upwardly into starting position and cup 10 is removed from the die in any suitable manner. Thus the stamped article is trimmed during the stamping operation and the edge so trimmed is smooth and does not require any additional finishing operations.

The distance or depth of shoulder 20 being equal to the thickness of sheet material A makes the diameter of the shoulder portion 16ª substantially of the same diameter as the diameter of recess 15 as indicated by line H and consequently when shoulder 20 reaches a predetermined point in its downward travel it will sever the marginal portion X from cup 10.

The edge of the stamping is clear cut having no jagged or rough portions so that no extra operation is required to trim the edge. The severed marginal portions which are forced on the upper portion of the punch are allowed to accumulate to a definite thickness, whereupon the uppermost are cut by knives 24.

In Figure 7 is shown a modified form of the punch wherein the lower or reduced part 16ᵇ is removable from the upper portion 16ᶜ so that the latter may be ground to sharpen the cutting shoulder 20ª when the latter is worn. The two parts of the punch are held together by screw 25.

While I have described the punch 16 as being movable relative to the forming block 14, if desired the punch 16 could be rendered stationary and the forming block 14 made movable with respect to said punch. The stamping may be of any shape as the invention is applicable to any stamping operation wherein the article produced is formed with marginal flange.

By the use of my invention the cost of production of stamped articles is greatly reduced as the cost of separate trimming dies, as well as the cost of separate trimming operation is eliminated. Furthermore the production materially is increased since the extra handling of the articles incidental to the trimming operations is dispensed with.

Although only one embodiment of my invention has been herein shown and described, it is obvious that various changes may be made in practicing the same without departing from the spirit of the invention.

I claim:

1. In a die the combination of a die member having an outwardly curved mouth, a punch member having a marginal shoulder adapted to cooperate with the outwardly curved side wall portions of said die member and fitting snugly within the straight walls of said die member to trim the flanges of a stamped article during the forming movement of said punch member.

2. In a die the combination of a die member having an outwardly curved mouth, a punch member having a marginal shoulder which is adapted to cooperate with the side walls of said die member to trim the flanges of the article that is being formed, the depth of said shoulder being equal to the thickness of the material to be formed and the distance of said shoulder from the bottom of said punch member being such that said shoulder at the completion of the drawing operation occupies a position substantially in horizontal plane with the center of radius of said curved portion of said die member whereby said material is severed when said shoulder enters said die member.

3. A die comprising a die member and a punch member, one of said members being movable into engagement with the other one, said die member being formed with outwardly curved mouth and said punch member being provided with an annular shoulder adapted to cooperate with the curved wall of said die member for trimming the flanges of the article contained in said die immediately before said moved member reaches its extreme drawing position.

4. A die comprising a die for sheet metal work member and a punch member, said die member being formed with outwardly curved mouth and said punch member being provided with an annular shoulder fitting snugly within said die member, and cooperating with said outwardly curved mouth, whereby the flanges of the article that is being drawn are trimmed between said annular shoulder and the curved wall portion of said die member before the completion of the drawing stroke.

In testimony whereof I hereunto affix my signature this 10th day of February, 1926.

GEORGE A. DELF.